United States Patent Office 3,391,186
Patented July 2, 1968

3,391,186
BENZOIC ACIDS
Michel Leon Thominet, Paris, France, and James A. Nicholson, Hatfield, and Franklin M. Robinson, Ambler, Pa., assignors to Societe d'Etudes Scientifiques Industrielles de l'Ile-de France, Longjumeau, Essone, France, a corporation of France
No Drawing. Filed June 16, 1964, Ser. No. 375,666
6 Claims. (Cl. 260—519)

ABSTRACT OF THE DISCLOSURE

The compounds of this invention are 2-lower alkoxy-3-substituted-5-trifluoromethylbenzoic acids. These compounds are useful as intermediates for pharmaceutical and dyestuffs. When reacted with certain amines, the acids of this invention form substituted benzamides having activity as anti-emetics and tranquillizers. When reacted with certain aminoanthraquinones, they form vat dyestuffs of enhanced fastness and hypsochromic colors.

---

This invention relates to new aromatic acids. More specifically, this invention relates to new benzoic acids of the formula:

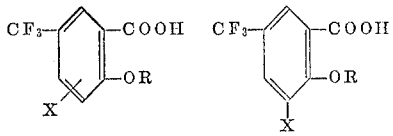

in which R is lower alkyl, X is hydrogen, nitro, amino, or halogen, X is ortho to OR when not hydrogen and to processes for preparing certain trifluoromethylbenzoic acids.

The compounds of this invention are important intermediates for pharmaceuticals, dyestuffs and other articles of commerce. When reacted with various amines, such as 2 - diethylaminoethylamine, 1-ethyl-2-aminomethyl pyrrolidine, 1-ethyl-3-aminopiperidine and the like, usually in the form of their acid chlorides, but also as an N-acyl imidazole, etc., these new acids form substituted benzamides of great interest as anti-emetics and tranquilizers. When reacted with various aminoanthraquinones, such as 1,4 - diaminoanthraquinone, 4,4'-diaminoindanthrene, 4-amino-2-phenyl-1(N)-2(S)thiazoloanthraquinone, 2(1,4-diamino - 2 - anthraquinonyl)2',3'-thiazoloanthraquinone and the like (by reaction as the acid chloride with the amine in nitrobenzene solution in the presence of an acid acceptor) they form vat dyestuffs of enhanced fastness and hypsochromic colors.

One of the important structural characteristics of the compounds of this invention, especially important for the pharmaceutical use, is an ortho lower alkoxy group, such as methyl, ethyl, propyl or butyl. Another structural characteristic is the presence of a trifluoromethyl group in a meta position to the carboxy. For further enhancement of activity, additional substituents can be present, such as nitro, amino or halogen next to the alkoxy.

2-alkoxy-5-trifluoromethylbenzoic acids are prepared from 2-chloro-5-trifluoromethylaniline. The amino group is diazotized by standard procedures and replaced with cyano using a Sandmeyer reaction with cuprous cyanide. It is important in this latter reaction to keep the mixture basic and thus the diazo solution is usually poured into a cuprous cyanide solution simultaneously with enough base to neutralize the acid present. The resulting 2-chloro-5-trifluoromethylbenzonitrile is hydrolyzed to the corresponding benzoic acid by heating in acid. This reaction is very sensitive to time, temperature and acid strength—as is true of all hydrolyses of nitriles in the presence of trifluoromethyl groups. Conditions must be carefully controlled to avoid hydrolysis of the $CF_3$ group. A very favorable combination is in 63% sulfuric acid at 155° C. Generally, temperatures of 150–160° and acid concentrations of 60–65% are used. If the acid concentration or the temperature is much reduced, there is incomplete hydrolysis and if either is increased, too much hydrolysis occurs. The 2-chloro-5-trifluoromethylbenzoic acid is then esterified. This can be accomplished by any known means such as heating with a lower alkanol and a trace of mineral acid, although diazomethane is the preferred agent. The esterifying groups can be any desired group but methyl is preferred. The ester is then reacted with an alkali metal lower alkoxide (e.g., sodium or potassium methoxide, ethoxide, propoxide or the like) to form the 2-alkoxy-5-trifluoromethylbenzoic acid (the ester group being saponified when the reaction mixture is diluted with water and heated). If desired, this compound can be nitrated in the 3-position, using a mixed acid of nitric and sulfuric acids, and the resulting nitro group can be reduced catalytically to give the 2-alkoxy-3-amino-5-trifluoromethylbenzoic acid. The amino group can then be replaced with halogen, by a Sandmeyer reaction, if desired.

This invention can be illustrated by the following examples in which temperatures are in degrees centigrade unless otherwise specified.

EXAMPLE 1.—2-METHOXY-5-TRIFLUORO-METHYLBENZOIC ACID

A. 2-chloro-5-trifluoromethylbenzoic acid 4-chloro-3-cyanobenzotrifluoride (50 g.) and 63% sulfuric acid (465 ml.) are heated to 152° over a 15-minute period and held at 150°±1° for 22 minutes. The reaction mixture is then poured onto ice and filtered. The white solid is then washed with water and extracted with benzene. The benzene is washed twice with 75 ml. portions of saturated sodium bicarbonate. This extract is then made acid (pH 3) and extracted with benzene. The crude product results when the benzene is removed. After recrystallization from hexane, the M.P. is 92.5–93.5°.

Analysis.—Calcd. for $C_8H_4ClF_3O_2$: C, 42.77; H, 1.80. Found: C, 43.46; H, 1.99.

B. 2-chloro-5-trifluoromethylbenzoic acid methyl ester 2-chloro-5-trifluoromethylbenzoic acid (10 g.) is dissolved in a 1:1 mixture of methanol and ether (20 ml.) and to this is slowly added a solution of diazomethane (1.8 g.) in ether (150 ml.). After 10 minutes at room temperature, the solvent is removed on a steam bath. The resultant oil is not purified before use in the next step.

C. 2-methoxy-5-trifluoromethylbenzoic acid

The crude 2 - chloro - 5-trifluoromethylbenzoic acid methyl ester is added to an alcoholic solution of sodium methoxide (4.6 g. of sodium dissolved in 100 ml. of dry methanol) and refluxed for 60 hours. Water (27 ml.) is then added and refluxing is continued for 20 minutes. The reaction mixture is evaporated almost to dryness and water (10 ml.) added. The mixture is made acid (pH 3) and the crude 2-methoxy-5-trifluoromethyl benzoic acid filtered. After recrystallizing from hexane the M.P. is 103–5°.

Analysis.—Calcd. for $C_9H_7F_3O_3$: C, 49.14; H, 3.21. Found: C, 48.98; H, 3.26.

EXAMPLE 2

2-methoxy-3-nitro-5-trifluoromethylbenzoic acid 2-methoxy-5-trifluoromethylbenzoic acid (5.92 g.) is dissolved in fuming sulfuric acid (20–23% $SO_3$) (27.8 g.) and 90% nitric acid (6.85 g.) is added dropwise with stirrring. The temperature rises to 55° and is held during the addition of the acid (55 minutes). The reaction mixture is poured onto ice, filtered, and the solid recrystallized from water to yield 2-methoxy-3-nitro-5-trifluoromethylbenzoic acid (M.P. 141–2°).

*Analysis.*—Calcd. for $C_9H_6F_3NO_5$: C, 40.78; H, 2.28; N, 5.28. Found: C, 41.07; H, 2.32; N, 5.41.

EXAMPLE 3

2-methoxy-3-amino-5-trifluoromethylbenzoic acid 2-methoxy-3-nitro-5-trifluoromethylbenzoic acid (2 g.) is dissolved in glacial acetic acid (20 ml.) and platinum oxide (200 mg.) is added. The reaction mixture is then reduced by shaking with hydrogen at approximately 1 atm. pressure. The solution is filtered under ntirogen through a pad of Supercel and then evaporated to dryness. The 2-methoxy-3-amino-5-trifluoromethylbenzoic acid is recrystallized from carbon tetrachloride (M.P. 110–112°).

*Analysis.*—Calcd. for $C_9H_8F_3NO_3$: C, 45.95; H, 3.43; N, 5.96. Found: C, 46.02; H, 3.50; N, 5.88.

EXAMPLE 4

2-methoxy-3-chloro-5-trifluoromethylbenzoic acid 3-amino-2-methoxy-5-trifluoromethylbenzoic acid (2.35 g.) is added to 28% hydrochloric acid (4.4 ml.). Cracked ice is added to this mixture to cool it to about 0°. A white solid is present and to this mixture is added a solution of sodium nitrite (0.7 g.) in water (2 ml.). The temperature is held at 0–5° for 10 minutes by adding cracked ice. This diazonium solution is added quickly with stirring to a cuprous chloride solution prepared by adding a solution of sodium bisulfite (0.67 g.) and sodium hydroxide (0.44 g.) in water (5 ml.) to a solution of copper sulfate (3.13 g.) and sodium chloride (0.82 g.), in water (10 ml.), filtering, and adding the solid obtained to 28% hydrochloric acid (4.4 ml.). The addition of the diazonium solution causes much foaming. The reaction mixture is stirred for 45 minutes at room temperature and then at 55° for 15 minutes, cooled to room temperature and filtered to give crude 2 - methoxy - 3-chloro-5-trifluoromethylbenzoic acid. This is recrystallized from water (M.P. 108.5–110°).

*Analysis.*—Calcd. for $C_9H_6ClF_3O_3$: C, 42.46; H, 2.37. Found: C, 42.61; H, 2.54.

EXAMPLE 5

2-methoxy-3-bromo-5-trifluoromethylbenzoic acid 3-amino-2-methoxy-5-trifluoromethylbenzoic acid (2.3 g.) is added to 28% hydrobromic acid (6 ml.). Cracked ice is added to this mixture to cool to about 0°. A white solid is present and to this mixture is added a solution of sodium nitrite (0.7 g.) dissolved in water (2 ml.). The temperature is held at 0–5° for 10 minutes by adding cracked ice. This diazonium solution is quickly added with stirring to a cuprous bromide solution prepared by adding a solution of sodium bisulfite (0.67 g.) and sodium hydroxide (0.44 g.) in water (5 ml.) to a solution of copper sulfate (3.13 g.) and sodium bromide (1.44 g.), in water (10 ml.), filtering, and adding the solid to 28% hydrobromic acid (6 ml.). The addition of the diazonium solution causes much foaming. The reaction mixture is stirred for one hour at room temperature, then at 65° for 35 minutes, cooled to room temperature and filtered to give crude product. This is recrystallized from water (M.P. 110–119°).

*Analysis.*—Calcd. for $C_9H_6BrF_3O_3$: C, 36.14; H, 2.02. Found: C, 36.81; H, 2.70.

We claim:
1. A compound of the formula:

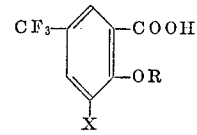

in which R is a lower alkyl group, and X is selected from the group consisting of hydrogen, nitro, amino, chloro and bromo.

2. 2-methoxy-5-trifluoromethyl benzoic acid.
3. 2-methoxy-3-nitro-5-trifluoromethyl benzoic acid.
4. 2-methoxy-3-amino-5-trifluoromethyl benzoic acid.
5. 2-methoxy-3-chloro-5-trifluoromethyl benzoic acid.
6. 2-methoxy-3-bromo-5-trifluoromethyl benzoic acid.

References Cited

UNITED STATES PATENTS 3,105,090  9/1963  Leonard _____ 260—520

OTHER REFERENCES

J.A.C.S., Caldwell et al. (vol. 73), 1951, pp. 5125 and 5126 relied on. Advanced Organic Chemistry, by Royals, 1961, pp. 607 and 456 relied on.

LORRAINE A. WEINBERGER, *Primary Examiner.*

L. A. THAXTON, *Assistant Examiner.*

UNITED STATES PATENT OFFICE
CERTIFICATE OF CORRECTION

Patent No. 3,391,186                                        July 2, 1968

Michel Leon Thominet et al.

It is certified that error appears in the above identified patent and that said Letters Patent are hereby corrected as shown below:

Column 4, line 17, "110-119°" should read -- 110-111° --.

Signed and sealed this 16th day of December 1969.

(SEAL)
Attest:

Edward M. Fletcher, Jr.                              WILLIAM E. SCHUYLER, JR.
Attesting Officer                                             Commissioner of Patents